US007667799B2

(12) United States Patent
Kuo et al.

(10) Patent No.: US 7,667,799 B2

(45) Date of Patent: Feb. 23, 2010

(54) LIQUID CRYSTAL DISPLAY PANEL AND LIQUID CRYSTAL DISPLAY DEVICE USING THE SAME

(75) Inventors: Chien-Chung Kuo, Taichung County (TW); Chien-Chung Chen, Taichung (TW)

(73) Assignee: Wintek Corporation, Taichung (TW)

( * ) Notice: Subject to any disclaimer, the term of this patent is extended or adjusted under 35 U.S.C. 154(b) by 162 days.

(21) Appl. No.: 12/109,375

(22) Filed: Apr. 25, 2008

(65) Prior Publication Data

US 2008/0297705 A1 Dec. 4, 2008

(30) Foreign Application Priority Data

May 30, 2007 (TW) .............................. 96119398 A

(51) Int. Cl.
*G02F 1/1335* (2006.01)

(52) U.S. Cl. ...................................... 349/106; 349/114

(58) Field of Classification Search .................. 349/106
See application file for complete search history.

(56) References Cited

U.S. PATENT DOCUMENTS

2007/0153165 A1* 7/2007 Hu et al. ..................... 349/106

* cited by examiner

*Primary Examiner*—Richard H Kim

(74) *Attorney, Agent, or Firm*—Thomas, Kayden, Horstemeyer & Risley

(57) ABSTRACT

A liquid crystal display (LCD) panel and a LCD device using the same are provided. The LCD panel includes a first substrate, a second substrate, a liquid crystal layer, an optical filter layer and a color conversion layer. The first substrate and the second substrate correspond to each other and seal the liquid crystal layer. Several pixels are constituted by the first substrate and the second substrate. The optical filter layer is disposed on the first substrate for a first color light to pass through. The color conversion layer is disposed at the second substrate. The color conversion layer has a first color conversion area, a second color conversion area and a passing area in each pixel, such that a second color light and a third color light are produced after the first color light passes through the first color conversion area and the second color conversion area, respectively.

35 Claims, 5 Drawing Sheets

300
331 332 333
310
312
330
313
390
344
343
340
342
311
395

LIQUID CRYSTAL DISPLAY PANEL AND LIQUID CRYSTAL DISPLAY DEVICE USING THE SAME

This application claims the benefit of Taiwan application Serial No. 96119398, filed May 30, 2007, the subject matter of which is incorporated herein by reference.

BACKGROUND OF THE INVENTION

1. Field of the Invention

The invention relates in general to a liquid crystal display (LCD) panel and a LCD device using the same, and more particularly to a transflective type LCD panel and a LCD device using the same.

2. Description of the Related Art

Liquid crystal display (LCD) panels are widely used in electronic devices such as mobile phones, personal digital assistants (PDAs) and notebook computers.

LCD panels are classified into several types such as reflective type LCD panels, transmissive type LCD panels and transflective type LCD panels according to sources of lights. The reflective type LCD panels use reflective plates to reflect an external light for providing light. The transmissive type LCD panels use backlight modules to generate a backlight for providing light. The transflective type LCD panels possessing the properties of the above-mentioned two types of the LCD panels use an external light (as the case in reflective type LCD panels) and a backlight (as the case in transmissive type LCD panels) to provide light.

Referring to FIG. 1A, a side view of a conventional transflective type LCD panel is shown. The transflective type LCD panel 100 includes a transflective plate 150 and a backlight module 110. By means of the transflective plate 150, the transflective type LCD panel 100 is capable of using both an external light L11 and a backlight L12 provided by the backlight module 110. However, the transflective plate 150 has lower transmission rate and lower reflectivity. When the transflective type LCD panel 100 is at the reflective mode, the external light is reflected by the transflective plate 150, so as to lower the overall light utilization rate.

Referring to FIG. 1B, a side view of another conventional transflective type LCD panel is shown. The transflective type LCD panel 200 includes a backlight module 210. Besides, the transflective type LCD panel 200 has a reflective plate 251 in each of the sub-pixels 270 to form a reflecting area 281. A light passing area 282 is formed outside the reflecting area 281 of the sub-pixel 270. The reflecting area 281 is capable of reflecting an external light L21, and the light passing area 282 allows a backlight L22 provided by the backlight module 210 to pass through. Thus, the transflective type LCD panel 200 is capable of using the external light L21 and the backlight L22 at the same time. At the reflective mode, the transflective type LCD panel 200 can display an image by using the reflecting area 281 to reflect the external light. However, as the sub-pixel 270 has both the reflecting area 281 and the light passing area 282, the aperture ratio of the transflective type LCD panel 200 at the transmissive mode and the reflective mode becomes smaller.

SUMMARY OF THE INVENTION

The invention is directed to a LCD panel and a LCD device using the same. The LCD panel has an optical filter layer and a color filter layer. An external light and a backlight are used via the optical filter layer, and the color of a visible light passing through the color filter layer is converted to different color.

According to a first aspect of the present invention, a LCD panel including a first substrate, a second substrate, a liquid crystal layer, an optical filter layer and a color conversion layer is provided. The second substrate is disposed opposite to the first substrate. A plurality of pixels are constituted by the first substrate and the second substrate. The liquid crystal layer is sealed between the first substrate and the second substrate. The optical filter layer is disposed on the first substrate for a first color light to pass through. The color conversion layer is disposed at the second substrate. The color conversion layer has a first color conversion area, a second color conversion area and a passing area in each of the pixels, such that a second color light is produced after the first color light passes through the first color conversion area, and a third color light is produced after the first color light passes through the second color conversion area.

According to a second aspect of the present invention, a LCD device including a LCD panel and a backlight module is provided. The LCD panel includes a first substrate, a second substrate, a liquid crystal layer, an optical filter layer and a color conversion layer. The second substrate is disposed opposite to the first substrate. A plurality of pixels are constituted by the first substrate and the second substrate. The liquid crystal layer is sealed between the first substrate and the second substrate. The optical filter layer is disposed on the first substrate for a first color light to pass through. The color conversion layer is disposed at the second substrate. The color conversion layer has a first color conversion area, a second color conversion area and a passing area in each of the pixels, such that a second color light is produced after the first color light passes through the first color conversion area, and a third color light is produced after the first color light passes through the second color conversion area. The backlight module is disposed at a side of the first substrate. The backlight module provides a backlight to the LCD panel.

The invention will become apparent from the following detailed description of the preferred but non-limiting embodiments. The following description is made with reference to the accompanying drawings.

DETAILED DESCRIPTION OF THE INVENTION

First Embodiment

Figure 1A:
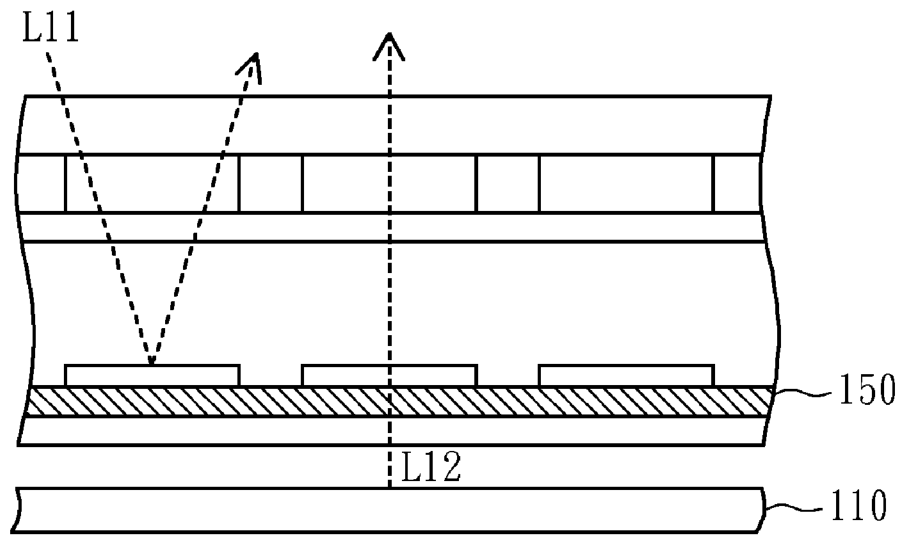
FIG. 1A (Prior Art) is a side view of a conventional transflective type LCD panel.
Figure 1B:
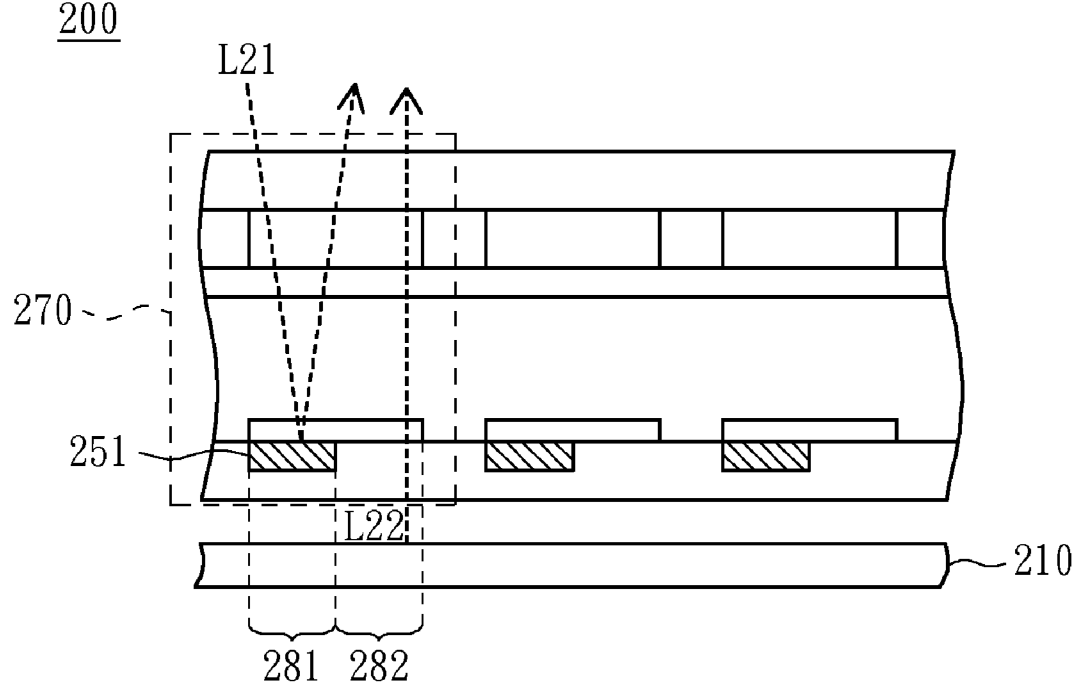
FIG. 1B (Prior Art) is a side view of another conventional transflective type LCD panel.
Figure 2:
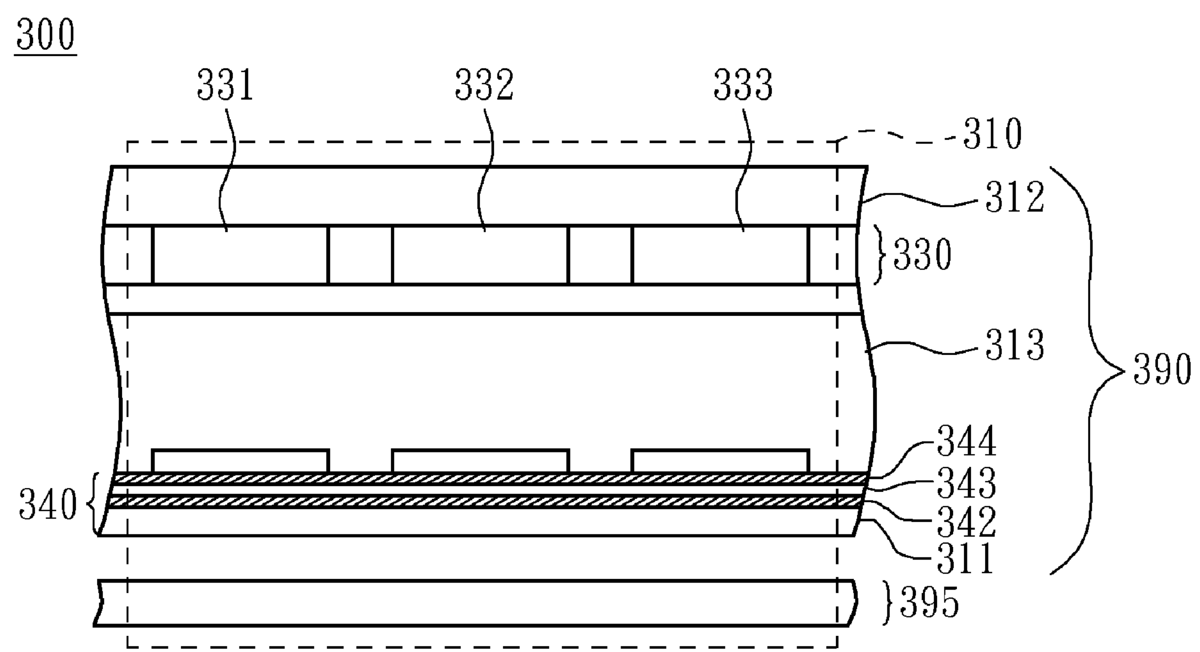
FIG. 2 is a side view of a LCD device according to a first embodiment of the invention.

Referring to FIG. 2, a side view of a LCD device according to a first embodiment of the invention is shown. As indicated in FIG. 2, the LCD device 300 of the present embodiment of the invention includes a LCD panel 390 and a backlight module 395. The backlight module 395 is disposed at a side of the LCD panel 390. The LCD panel 390 includes a first substrate 311, a second substrate 312, a liquid crystal layer 313, an optical filter layer 340 and a color conversion layer 330. The second substrate 312 is disposed opposite to the first substrate 311. A plurality of pixels (not illustrated) are constituted by the first substrate 311 and the second substrate 312. The present embodiment of the invention is exemplified by a pixel 310. The liquid crystal layer 313 is sealed between the first substrate 311 and the second substrate 312. The optical filter layer 340 is disposed on the first substrate 311.

The optical filter layer 340 is formed by a first metal layer 342, a gap layer 343 and a second metal layer 344 in order. Preferably, as indicated in FIG. 2, the optical filter layer 340 further includes a transparent substrate. In the present embodiment of the invention, the first substrate 311 is treated as the transparent substrate for carrying the first metal layer 342, the gap layer 343 and the second metal layer 344. The transparent substrate (that is, the first substrate 311) can be a glass substrate, a plastic substrate or a plastic soft film. The first metal layer 342 and the second metal layer 344 are made of silver or silver alloy, and the thickness of the first metal layer 342 and the thickness of the second metal layer 344 range between 5 nm~60 nm. The gap layer 343 can be a dielectric film or a metallic conductive oxide. The dielectric film is made of magnesium fluoride ($MgF_2$), silicon dioxide ($SiO_2$), aluminum oxide ($Al_2O_3$), titanium dioxide ($TiO_2$), zirconium dioxide ($ZrO_2$) or niobium oxide ($Nb_2O_5$). Preferably, if the gap layer 343 is made of silicon dioxide, the thickness of the gap layer 343 ranges between 10 nm~120 nm; if the gap layer 343 is made of titanium dioxide, the thickness of the gap layer 343 ranges between 10 nm~55 nm. In addition, if the gap layer 343 is a metallic conductive oxide, the gap layer 343 is made of indium tin oxide (ITO), indium zinc oxide (IZO) or aluminum zinc oxide (AZO).

Figure 3:
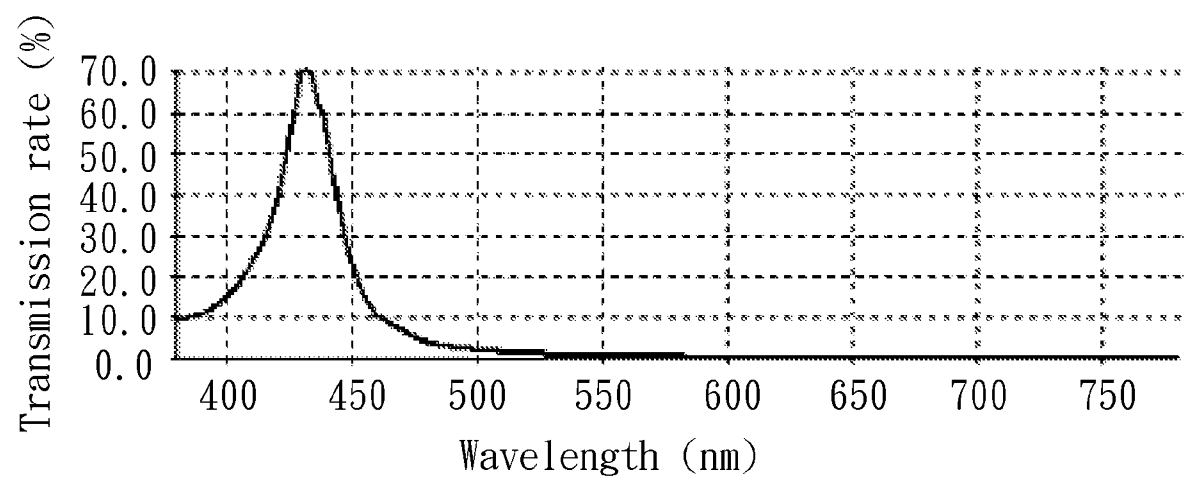
FIG. 3 is a transmission spectrum of a white light passing through the optical filter layer.

If the thickness and the material of the gap layer 343 are selected appropriately, the optical filter layer 340 allows a visible light whose wavelength is within a particular range to pass through. In the present embodiment of the invention, the optical filter layer 340 is for a blue light to pass through. For example, the gap layer 343 is made of silicon dioxide and the thickness of the gap layer 343 ranges between 70 nm~110 nm. Referring to FIG. 3, a transmission spectrum of a white light passing through the optical filter layer is shown. As indicated in FIG. 3, after the white light passes through the optical filter layer 340, the visible light whose wavelength ranges between 400 nm~450 nm has a higher transmission rate. The visible light whose wavelength ranges between 400 nm~450 nm is normally treated as a blue visible light. Therefore, the optical filter layer 340 in the LCD panel 390 is for a blue light to pass through.

Referring to FIG. 2, the color conversion layer 330 is disposed at the second substrate 312. In the present embodiment of the invention, the color conversion layer 330 is disposed between the first substrate 311 and the second substrate 312. The color conversion layer 330 has a first color conversion area 331, a second color conversion area 332 and a passing area 333 in the pixel 310, wherein each of the first color conversion area 331, the second color conversion area 332 and the passing area 333 correspond to a sub-pixel.

In the present embodiment of the invention, the materials of the first color conversion area 331 and the second color conversion area 332 of the color conversion layer 330 comprise a fluorescent dye and a binder resin. Examples of the fluorescent dye used in the first color conversion area 331 of the color conversion layer 330 are pyridine-based dye and rhodamine-based dye. The fluorescent dye used in the first color conversion area 331 of the color conversion layer 330 is capable of absorbing a visible light whose wavelength ranges between 400 nm~600 nm and emitting another visible light whose wavelength ranges between 600 nm~700 nm. Therefore, the fluorescent dye used in the first color conversion area 331 is for converting a blue visible light into a visible light whose color is close to red.

Examples of the fluorescent dye used in the second color conversion area 332 of the color conversion layer 330 are coumarin dye and naphthalimide dye. The fluorescent dye used in the second color conversion area 332 of the color conversion layer 330 is capable of absorbing a visible light whose wavelength ranges between 400 nm~600 nm and emitting another visible light whose wavelength ranges between 480 nm~600 nm. Therefore, the fluorescent dye used in the second color conversion area 332 is for converting a blue visible light into a visible light whose color is close to green. The passing area 333 of the color conversion layer 330 is made of a transparent photoresistor, or the passing area 333 is a hollow structure. In the present embodiment of the invention, the passing area 333 is made of a transparent photoresistor to substantially maintain the identical flatness of the color conversion layer 330.

Figure 4A:
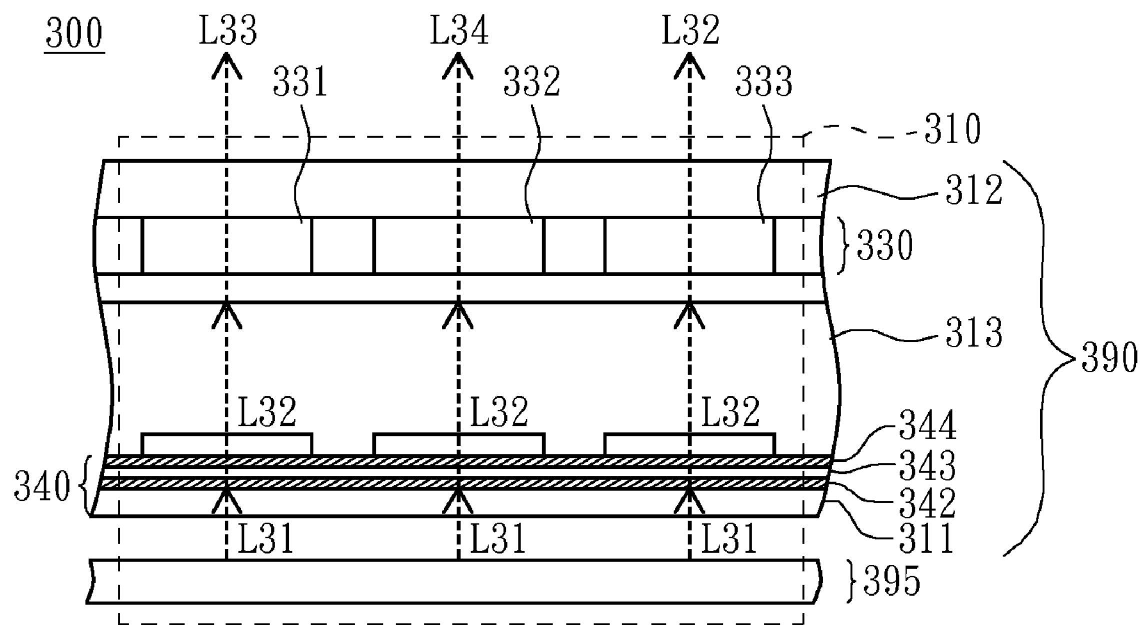
FIG. 4A is a perspective showing a backlight of the backlight module of FIG. 2 passing through the LCD panel.

Referring to FIG. 4A, a perspective showing a backlight of the backlight module of FIG. 2 passing through the LCD panel is shown. The backlight module 395 is disposed at a side of the first substrate 311. At the transmissive mode, the backlight module 395 provides a backlight L31 to the LCD panel 390. When the backlight L31 is emitted to the optical filter layer 340, only a light with a specific color, such as a first color light L32, is allowed to pass through the optical filter layer 340. The reason is that the optical filter layer 340 is capable of selecting lights with specific transmission spectrum to pass through. According to the above disclosure, the first color light L32 of the present embodiment of the invention is a blue light. That is, the optical filter layer 340 only allows the blue light to pass through.

Next, the first color light L32 (the blue light) is emitted into the liquid crystal layer 313. Then, after the first color light L32 passes through the first color conversion area 331 and the second color conversion area 332 of the color conversion layer 330, a second color light L33 and a third color light L34 are produced respectively. The second color light L33 and the third color light L34 are a red light and a green light, respectively. In other words, the red light and the green light are respectively produced after the blue light passes through the first color conversion area 331 and the second color conversion area 332. Besides, as the passing area 333 is made of a transparent photoresistor, the first color light L32 still keeps its original color (blue) after passing through the passing area 333. Thus, after backlights pass through the color conversion layer 330, each of the sub-pixels emits a red light, a blue light and a green light, so that the LCD panel 390 is capable of displaying a colored image at the transmissive mode.

Figure 4B:
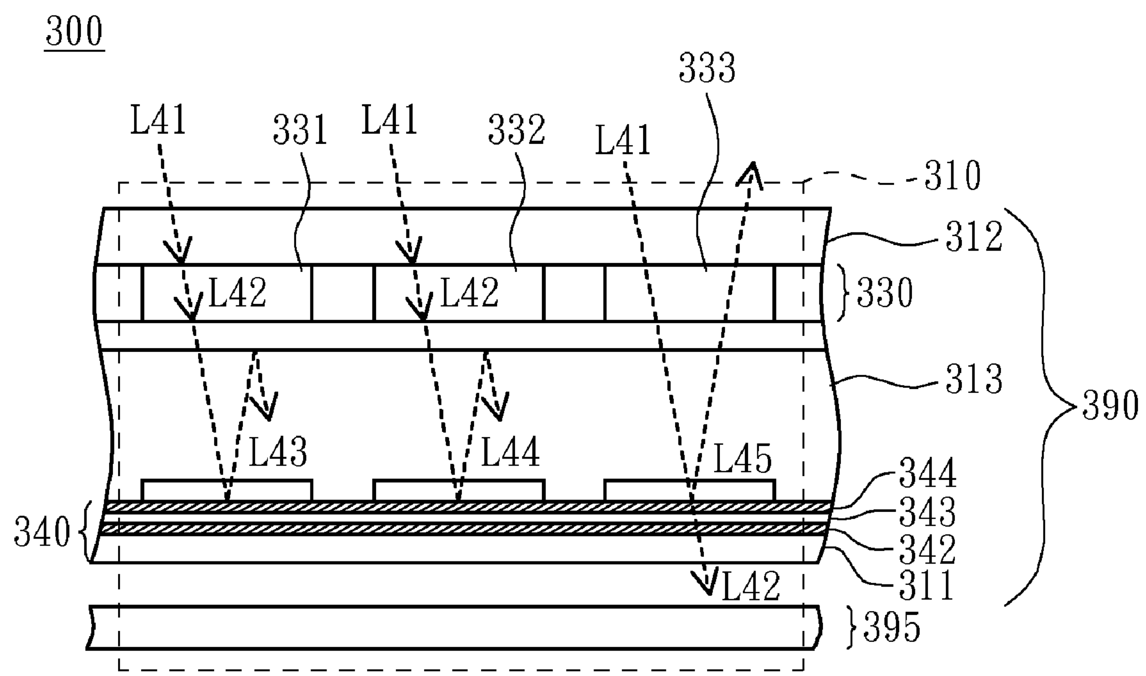
FIG. 4B is a perspective showing the reflection of an external light emitted into the LCD panel.

Referring to FIG. 4B, a perspective showing the reflection of an external light emitted into the LCD panel. In the present embodiment of the invention, the external light L41 is a white light as an example. After the external light L41 is emitted into the LCD panel 390, the external light L41 firstly passes through the color conversion layer 330. As the external light L41 is a white light, the blue light L42 of the external light L41 is allowed to pass through the first color conversion area 331 and the second color conversion area 332 of the color conversion layer 330, and a red light L43 and a green light L44 are produced respectively. After that, the red light L43 and the green light L44 are respectively emitted to the liquid crystal layer 313 and then directly emitted to the optical filter layer 340. The optical filter layer 340 only allows the blue light L42 to pass through, so the optical filter layer 340 reflects the red light L43 and the green light L44. Meanwhile, the red light L43 and the green light L44 are not allowed to pass through the first color conversion area 331 and the second color conversion area 332 of the color conversion layer 330. Thus, the energy loss of the red light L43 and the green light L44 occur due to the repeating reflection of the red light L43 and the green light L44, and the red light L43 and the green light L44 fade away finally.

On the other hand, if the external light L41 is emitted into the LCD panel 390 from the passing area 333 of the color conversion layer 330, as the passing area 333 is made of a transparent photoresistor in the present embodiment of the invention, the external light L41 still keeps its original color, that is, white. If the external light L41 is emitted to the liquid crystal layer 313 and then emitted to the optical filter layer 340, as the optical filter layer 340 only allows a blue light to pass through, the blue light L42 of the external light L41 passes through the optical filter layer 340 and emits towards the first substrate 311. The remaining external light is reflected by the optical filter layer 340, and the color composition of the remaining external light is a mixed light of the red light L43 and the green light L44, that is, a yellow light L45. The yellow light L45 passes through the passing area 333 without changing its color.

In other words, at the reflective mode, after the blue light L42 passes through the first color conversion area 331 and the second color conversion area 332, the red light L43 and the green light L44 are produced respectively. However, the optical filter layer 340 reflects all lights except a blue light. Therefore, in the LCD panel 390, the red light L43 and the green light L44 keep reflecting and losing energy. The external light L41 still keeps its original color after passing through the passing area 333. After that, when the external light L41 is emitted to the optical filter layer 340, only the blue light L42 passes through the optical filter layer 340 and the remaining external light is mixed and then reflected by the optical filter layer 340 to pass through the passing area 333.

Second Embodiment

Figure 5:
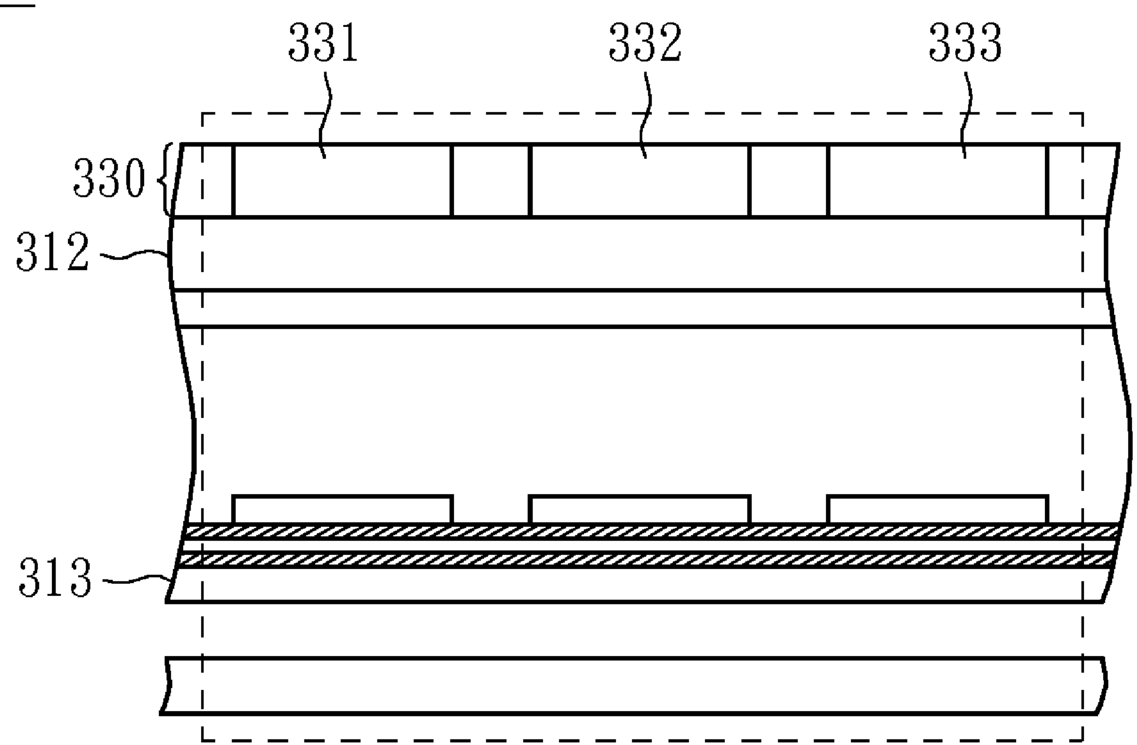
FIG. 5 is a side view of a LCD device according to a second embodiment of the invention.

Referring to FIG. 5, a side view of a LCD device according to a second embodiment of the invention is shown. The present embodiment of the invention differs from the first embodiment in the disposition of the color conversion layer 330 of the LCD device 300. In the present embodiment of the invention, the color conversion layer 330 is disposed to an outer side of the second substrate 312 opposite to the first substrate 313. Despite the position of the color conversion layer 330 is changed in the present embodiment of the invention, the color conversion layer 330 still provides the same effect as in the first embodiment.

That is, in the present embodiment of the invention, an incident light will change or keep its original color when passing through different areas of the color conversion layer 330. The incident light will be converted into red when passing through a first color conversion area 331. The incident light will be converted into green when passing through a second color conversion area 332. The incident light will keep its original color when passing through a passing area 333 because the material of the passing area 333 is a transparent photoresistor or the passing area 333 is a hollow structure.

To summarize, the LCD panels and the LCD devices using the same are disclosed in the above embodiments of the invention. The LCD panels include the optical filter layers and the color conversion layers. The color conversion layers have the first color conversion areas, the second color conversion areas and the passing areas, such that the second color lights (red lights) are produced after the first color lights pass through the first color conversion areas, and the third color lights (green lights) are produced after the first color lights pass through the second color conversion areas. The lights passing through the passing areas still keep their original colors because the passing areas are made of transparent photoresistors or the passing areas are hollow structures.

Thus, the LCD panels of the above embodiments of the invention do not have the same disadvantages in the conventional transflective type LCD panels 100 and 200. The design of the conventional transflective type LCD panel 200 adopts the reflective plate 251 but results in a smaller aperture ratio. The LCD devices of the embodiments of the invention use the optical filter layers and the color conversion layers to increase the transmission rate, hence resulting in a higher aperture ratio. The LCD devices further increase the light utilization rate and reduce the loss of the power.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:

a first substrate;

a second substrate disposed opposite to the first substrate, wherein a plurality of pixels are constituted by the first substrate and the second substrate;

a liquid crystal layer sealed between the first substrate and the second substrate;

an optical filter layer disposed on the first substrate for a first color light to pass through; and a color conversion layer disposed at the second substrate, wherein the color conversion layer has a first color conversion area, a second color conversion area and a passing area in each of the pixels, such that a second color light is produced after the first color light passes through the first color conversion area, and a third color light is produced after the first color light passes through the second color conversion area.

2. The LCD panel according to claim 1, wherein the color conversion layer is disposed between the first substrate and the second substrate.

3. The LCD panel according to claim 1, wherein the color conversion layer is disposed at an outer side of the second substrate opposite to the first substrate.

4. The LCD panel according to claim 1, wherein the optical filter layer is formed by a first metal layer, a gap layer and a second metal layer in order.

5. The LCD panel according to claim 4, wherein the optical filter layer further has a transparent substrate, and the optical filter layer is formed by the transparent substrate, the first metal layer, the gap layer and the second metal layer in order.

6. The LCD panel according to claim 5, wherein the transparent substrate is a glass substrate, a plastic substrate or a plastic soft film.

7. The LCD panel according to claim 4, wherein the first metal layer and the second metal layer are made of silver or silver alloy, and the gap layer is a dielectric film or a metallic conductive oxide.

8. The LCD panel according to claim 4, wherein the thickness of the first metal layer and the thickness of the second metal layer range between 5 nm~60 nm.

9. The LCD panel according to claim 4, wherein while the gap layer is a dielectric film, the dielectric film is made of magnesium fluoride ($MgF_2$), silicon dioxide ($SiO_2$), aluminum oxide ($Al_2O_3$), titanium dioxide ($TiO_2$), zirconium dioxide ($ZrO_2$) or niobium oxide ($Nb_2O_5$), and while the gap layer is a metallic conductive oxide, the metallic conductive oxide is made of indium tin oxide (ITO), indium zinc oxide (IZO) or aluminum zinc oxide (AZO).

10. The LCD panel according to claim 9, wherein if the gap layer is made of silicon dioxide, the thickness of the gap layer ranges between 10 nm~120 nm.

11. The LCD panel according to claim 9, wherein if the gap layer is made of titanium dioxide, the thickness of the gap layer ranges between 10 nm~55 nm.

12. The LCD panel according to claim 1, wherein the first color light is a blue light.

13. The LCD panel according to claim 12, wherein the second color light is a red light, and the third color light is a green light.

14. The LCD panel according to claim 1, wherein the material of the first color conversion area or the material of the second color conversion area of the color conversion layer comprises a fluorescent dye.

15. The LCD panel according to claim 14, wherein the material of the first color conversion area or the material of the second color conversion area of the color conversion layer further comprises a binder resin.

16. The LCD panel according to claim 1, wherein the passing area of the color conversion layer is made of a transparent photoresistor.

17. The LCD panel according to claim 1, wherein the passing area of the color conversion layer is a hollow structure.

18. A LCD device, comprising:

a LCD panel, comprising:

a first substrate;

a second substrate disposed opposite to the first substrate, wherein a plurality of pixels are constituted by the first substrate and the second substrate;

a liquid crystal layer sealed between the first substrate and the second substrate;

an optical filter layer disposed on the first substrate for a first color light to pass through; and a color conversion layer disposed at the second substrate, wherein the color conversion layer has a first color conversion area, a second color conversion area and a passing area in each of the pixels, such that a second color light is produced after the first color light passes through the first color conversion area, and a third color light is produced after the first color light passes through the second color conversion area; and a backlight module used for providing a backlight to the LCD panel.

19. The LCD device according to claim 18, wherein the color conversion layer is disposed between the first substrate and the second substrate.

20. The LCD device according to claim 18, wherein the color conversion layer is disposed at an outer side of the second substrate opposite to the first substrate.

21. The LCD device according to claim 18, wherein the optical filter layer is formed by a first metal layer, a gap layer and a second metal layer in order.

22. The LCD device according to claim 21, wherein the optical filter layer further has a transparent substrate, and the optical filter layer is formed by the transparent substrate, the first metal layer, the gap layer and the second metal layer in order.

23. The LCD device according to claim 22, wherein the transparent substrate is a glass substrate, a plastic substrate or a plastic soft film.

24. The LCD device according to claim 21, wherein the first metal layer and the second metal layer are both made of silver or silver alloy, and the gap layer is a dielectric film or a metallic conductive oxide.

25. The LCD device according to claim 21, wherein the thickness of the first metal layer and the thickness of the second metal layer range between 5 nm~60 nm.

26. The LCD device according to claim 21, wherein while the gap layer is a dielectric film, the dielectric film is made of magnesium fluoride, silicon dioxide, aluminum oxide, titanium dioxide, zirconium dioxide or niobium oxide, and while the gap layer is a metallic conductive oxide, the metallic conductive oxide is made of indium tin oxide, indium zinc oxide or aluminum zinc oxide.

27. The LCD device according to claim 26, wherein if the gap layer is made of silicon dioxide, the thickness of the gap layer ranges between 10 nm~120 nm.

28. The LCD device according to claim 26, wherein if the gap layer is made of titanium dioxide, the thickness of the gap layer ranges between 10 nm~55 nm.

29. The LCD device according to claim 18, wherein the first color light is a blue light.

30. The LCD device according to claim 29, wherein the second color light is a red light, the third color light is a green light.

31. The LCD device according to claim 18, wherein the material of the first color conversion area or the material of the second color conversion area of the color conversion layer comprises a fluorescent dye.

32. The LCD device according to claim 31, wherein the material of the first color conversion area or the material of the second color conversion area of the color conversion layer further comprises a binder resin.

33. The LCD device according to claim 18, wherein the passing area of the color conversion layer is made of a transparent photoresistor.

34. The LCD device according to claim 18, wherein the passing area of the color conversion layer is a hollow structure.

35. The LCD device according to claim 18, wherein the backlight module is disposed at a side of the first substrate.

* * * * *